(12) United States Patent
Stukenholtz et al.

(10) Patent No.: US 7,645,109 B2
(45) Date of Patent: Jan. 12, 2010

(54) COLLAPSIBLE STORAGE BIN (75) Inventors: Ty E. Stukenholtz, Nebraska City, NE (US); Jay E. Stukenholtz, Nebraska City, NE (US)

(73) Assignee: Cobco Manufacturing, Inc., Nebraska City, NE (US)

( * ) Notice: Subject to any disclaimer, the term of this patent is extended or adjusted under 35 U.S.C. 154(b) by 0 days.

(21) Appl. No.: 11/788,881

(22) Filed: Apr. 23, 2007

(65) Prior Publication Data
US 2008/0261672 A1 Oct. 23, 2008

(51) Int. Cl.
*B60P 1/00* (2006.01)
(52) U.S. Cl. .................. 414/505; 220/6; 460/119
(58) Field of Classification Search ........... 460/119, 460/23; 414/505, 501, 800, 787, 295, 497, 414/421; 220/4.03, 6, 7, 254.28
See application file for complete search history.

(56) References Cited

U.S. PATENT DOCUMENTS

| 2,384,389 | A | * | 9/1945 | Moore | 294/68.24 |
|---|---|---|---|---|---|
| 3,184,261 | A | * | 5/1965 | Young | 296/26.07 |
| 3,450,284 | A | * | 6/1969 | Diem | 414/497 |
| 3,635,368 | A | * | 1/1972 | Winsor | 220/6 |
| 3,818,955 | A | * | 6/1974 | Kline | 141/12 |
| 3,918,502 | A | * | 11/1975 | Kline | 56/344 |
| 3,924,889 | A | * | 12/1975 | Gogush | 296/176 |
| 4,008,819 | A | * | 2/1977 | Hanaway | 414/505 |
| 4,106,649 | A | * | 8/1978 | Nelson et al. | 414/505 |
| 4,466,549 | A | * | 8/1984 | Hanaway | 220/4.03 |
| 4,519,189 | A | * | 5/1985 | Fachini et al. | 56/16.6 |
| 4,542,932 | A | * | 9/1985 | Whiteman | 296/160 |
| 4,544,196 | A | * | 10/1985 | Schmeichel et al. | 296/26.07 |
| 4,735,330 | A | * | 4/1988 | Hoss | 220/6 |
| 4,930,297 | A | * | 6/1990 | Schlueter et al. | 56/16.6 |
| 4,960,300 | A | * | 10/1990 | Burvee | 296/34 |
| 4,996,831 | A | * | 3/1991 | Pearson et al. | 56/16.6 |
| 5,056,667 | A | * | 10/1991 | Coogan | 206/600 |
| 5,080,442 | A | * | 1/1992 | Doering et al. | 298/6 |
| 5,151,064 | A | * | 9/1992 | Damman et al. | 460/23 |
| 5,238,288 | A | * | 8/1993 | Chandler | 296/100.18 |
| 5,249,842 | A | * | 10/1993 | Doering et al. | 298/6 |
| 5,291,722 | A | * | 3/1994 | Schweigert | 56/203 |
| 5,366,266 | A | * | 11/1994 | Harbison | 296/100.02 |
| 5,427,572 | A | * | 6/1995 | Deutsch et al. | 460/119 |
| 6,029,312 | A | * | 2/2000 | Whitney | 15/347 |
| 6,082,570 | A | * | 7/2000 | Tai | 220/6 |
| 6,126,220 | A | * | 10/2000 | Brasher | 296/26.04 |
| 6,358,141 | B1 | | 3/2002 | Stukenholtz | |
| 6,508,705 | B1 | * | 1/2003 | Van Overschelde | 460/23 |
| 6,679,772 | B2 | * | 1/2004 | Johnson et al. | 460/23 |
| 6,692,352 | B2 | * | 2/2004 | Gerber et al. | 460/119 |

(Continued)

*Primary Examiner*—Árpád Fábián-Kovács
(74) *Attorney, Agent, or Firm*—Brett Trout (57) ABSTRACT

An agricultural vehicle such as a combine is provided with a collapsible agricultural material storage bin. The bin may be collapsed to allow for decreased overall vertical height during transport to avoid contact with obstacles, such as overhead power lines and street lights. In the field, the agricultural material storage container may be expanded to increase the agricultural material holding capacity of the vehicle. The bin may be provided with an internal extension mechanism to increase the lifting power of the container to allow for the placement of a second container or other material thereabove. Alternatively, the container may be provided with an external lifting means to allow for unobstructed evacuation of the interior of the container.

18 Claims, 11 Drawing Sheets

U.S. PATENT DOCUMENTS

| | | | |
|---|---|---|---|
| 6,752,715 B2 * | 6/2004 | Stephens et al. | 460/23 |
| 7,101,280 B2 * | 9/2006 | Colpaert | 460/119 |
| 7,118,165 B2 * | 10/2006 | Nelson et al. | 296/186.2 |
| 2004/0033823 A1 * | 2/2004 | Stephens et al. | 460/119 |
| 2007/0051084 A1 * | 3/2007 | Whitney | 56/202 |

* cited by examiner

COLLAPSIBLE STORAGE BIN

BACKGROUND OF THE INVENTION

1. Field of the Invention

The present invention relates in general to a system for increasing and decreasing the size of a storage container and, more particularly, to a system for increasing and decreasing the size of an agricultural materials storage container positioned on an agricultural vehicle.

2. Description of the Prior Art

The present invention relates to an improved system for storing agricultural material. It is known in the prior art to provide harvesting and threshing machines, typically called combines, for the collection and storage of agricultural materials, such as grain. Typically, combines have an onboard storage bin of a fixed capacity. While it is desirable to increase the capacity of such storage bins, it is also desirable to provide a combine with a minimum height to allow the combine to be transported on roads and underneath stoplights electrical wires.

Although agricultural vehicles are typically used in agricultural fields, it is often necessary to transport the agricultural vehicles via roadways. As roadways contain many overhead obstacles, including power lines and street lights, it is desirable to maintain the size of the agricultural vehicle below a particular height during transport to avoid undesired contact and damage associated with these overhead obstacles. Conversely, when in the field, there are very few overhead obstacles. It would, therefore, be desirable when the vehicle is in the field to increase the size of the agricultural material storage container so as to allow the vehicle to carry more agricultural material onboard.

While it is known in the art to provide a collapsible material storage container, such prior art containers typically involve sides, the tops of which collapse downward and inward for transport. One drawback associated with this orientation is the inability to provide the collapsible storage container with a cover. As the dimensions of the top of the prior art collapsible storage containers decreases as it collapses, any cover must typically be removed before the collapsible material container is collapsed, and reattached after the collapsible material container is expanded. It would, therefore, be desirable to provide a collapsible material storage container to which a cover may be attached and maintained during collapsing and expansion of the container.

It is also known in the art to provide assemblies on top of grain storage material. Prior art devices such as that described in U.S. Pat. No. 6,358,141, which is incorporated herein by reference, utilize a supplemental material storage container positioned above the grain storage container. This orientation allows for additional storage area and/or the collection of two different agricultural materials at the same time.

As the tops of the sides of the prior art collapsible storage container collapse downward and inward, they are not capable of sustaining a large load. Accordingly, prior art systems which utilize a supplemental storage container on top of the grain storage area cannot be used in association with prior art collapsible storage containers. It would, therefore, be desirable to provide a collapsible storage container with means for expanding the collapsible material storage container against heavy loads, such as those encountered when supplemental material containers or the like are positioned above the collapsible material storage container.

It is known in the prior art to provide a supplemental material container positioned above the main agricultural material container. The prior art, however, does not teach any way to decrease the height of the supplemental material agricultural container to allow maximum clearance of the agricultural vehicle during transport on roadways. It would, therefore, be desirable to provide a mechanism for collapsing a supplemental material storage container. It would additionally be desirable to provide a collapsible supplemental container having an unobstructed interior to facilitate the unloading of agricultural material. It would also be desirable to provide a collapsible agricultural material container without internal mechanicals obstructing unloading systems.

Based on the foregoing, it would be desirable to provide an adjustable capacity grain bin to allow the bin to handle an increased amount of agricultural material in use, and to allow the height of the combine or other agricultural vehicle to which it is attached to have a decreased vertical height during transport. It would also be desirable to provide a grain bin of adjustable capacity which may alternatively be provided with a large lifting means for the adjustability of the grain bin when a weight is positioned on top of the grain bin, and for a grain bin with the adjustability feature being placed exterior of the grain bin to allow for the use of systems which require open access across the interior of the grain bin.

The difficulties encountered in the prior art discussed hereinabove are substantially eliminated by the present invention.

SUMMARY OF THE INVENTION

In an advantage provided by the present invention, a system is provided for increasing the capacity of a grain bin for receipt of agricultural material during harvesting of the agricultural material.

Advantageously, this invention provides a system for decreasing a vertical height of an agricultural vehicle provided with a grain bin during transport of the agricultural vehicle.

Advantageously, this invention provides a system for increasing the capacity of a grain bin without obstructing the interior of the grain bin.

Advantageously, this invention provides a system for collapsing and expanding an agricultural material container which may be provided with a cover throughout the collapsing and expanding.

Advantageously, this invention provides a system for expanding an agricultural material container against a load.

Advantageously, this invention provides a system for expanding and collapsing an agricultural material container which does not prohibit movement of the walls across the floor to motivate material from the interior of the agricultural material container.

Advantageously, this invention provides a system for expanding and collapsing an agricultural material container which is of a low-cost, lightweight manufacture.

Advantageously, this invention provides a system for expanding and collapsing an agricultural material container which may be easily retrofit onto existing combines and other agricultural vehicles.

Advantageously, this invention provides a system for expanding and collapsing an agricultural material container which is of a low maintenance construction.

In an advantage provided by this invention, a material transport vehicle is provided comprising a wheeled frame coupled to a container. The container is provided with a first sidewall and a second sidewall. Means are provided for pivoting the sidewalls toward a horizontal position, sufficiently to decrease the height of the sidewalls by at least sixty percent in a manner in which the tops of the sidewalls do not pass over the bottoms of the sidewalls. In the preferred embodiment, the container is covered during collapse and expansion, and may even have another container stacked on top of the cover.

BRIEF DESCRIPTION OF THE DRAWINGS

The present invention will now be described, by way of example, with reference to the accompanying drawings in which.

DETAILED DESCRIPTION OF THE PREFERRED EMBODIMENT

Figure 1:
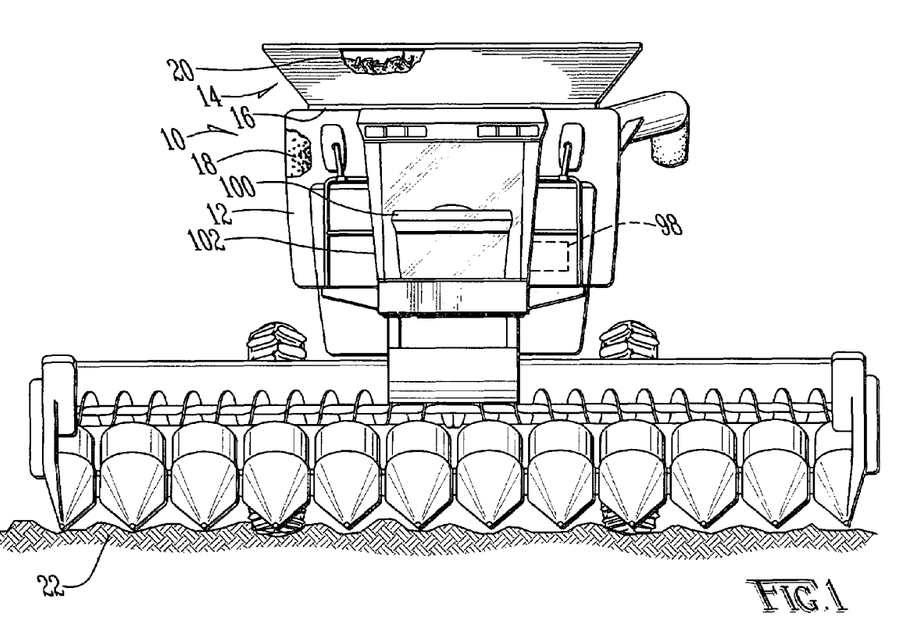
FIG. 1 illustrates a front elevation in partial cutaway of a combine provided with a collapsible agricultural material storage container of the present invention in the extended position.

A combine according to the present invention is shown generally as (10) in FIG. 1. The combine (10) is provided with a grain storage bin (12). Coupled to the grain storage bin (12) is an extension bin (14). While in the preferred embodiment the extension bin (14) is in fluid communication with the grain storage bin (12), if desired, the extension bin (14) may be provided with a floor (16) to separate the extension bin (14) from the grain storage bin (12) to allow a first agricultural material (18), such as corn kernels to be stored in the grain storage bin (12) and a second agricultural material (20), such as corncobs, to be stored in the extension bin (14).

Figure 2:
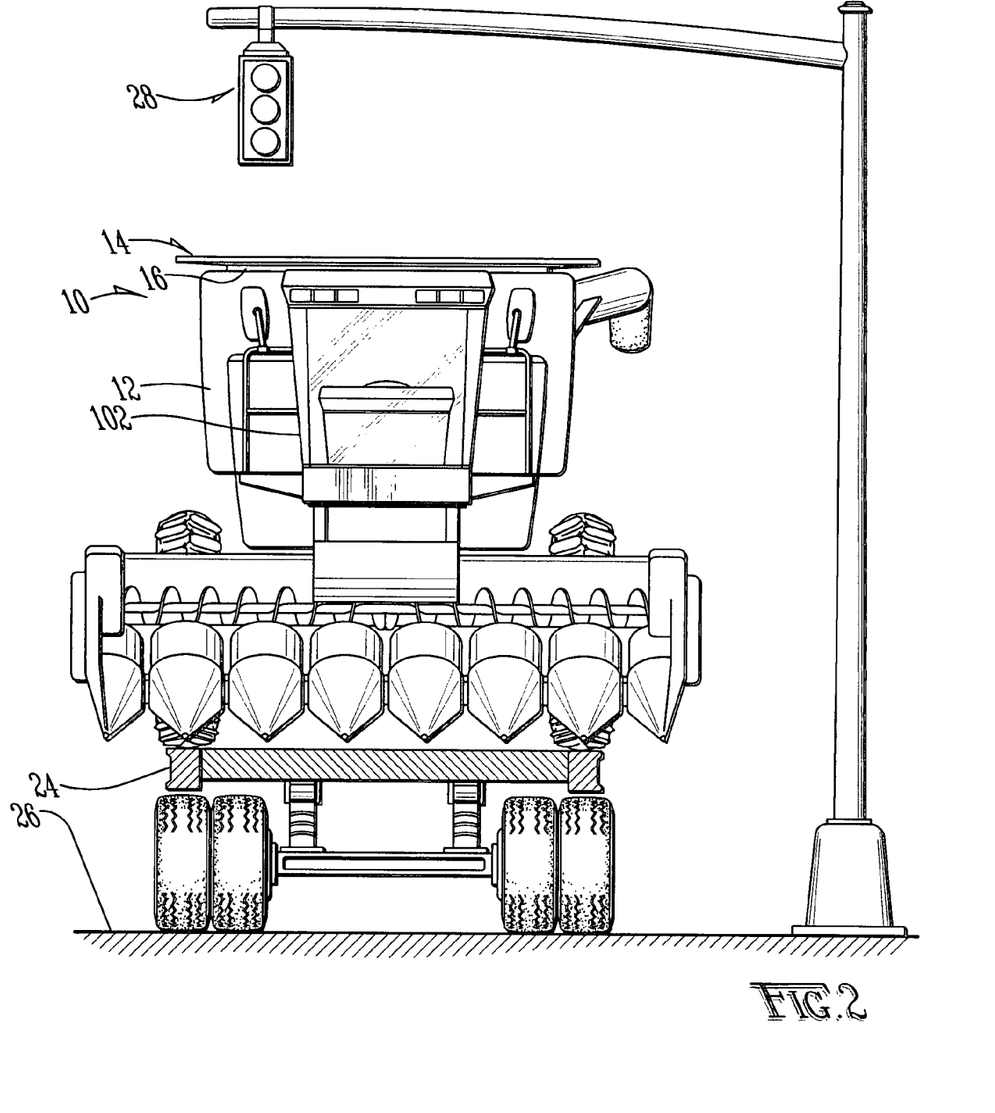
FIG. 2 illustrates the combine shown with the collapsible agricultural material storage container in the collapsed position.

As shown in FIG. 1, the extension bin (14) is extended to increase the capacity of the extension bin (14) as the combine is being used in an agricultural field (22). As shown in FIG. 2, when it is desired to transport the combine (10), the extension bin (14) is collapsed. Collapsing the extension bin (14) allows the combine (10) to be transported on a transport vehicle (24), such as a flatbed or the like as the combine (10) is being transported over roadways (26). Collapsing the extension bin (14) provides sufficient clearance between the extension bin (14) and overhead obstacles (28), such as street lights, electrical lights and the like.

Figure 3:
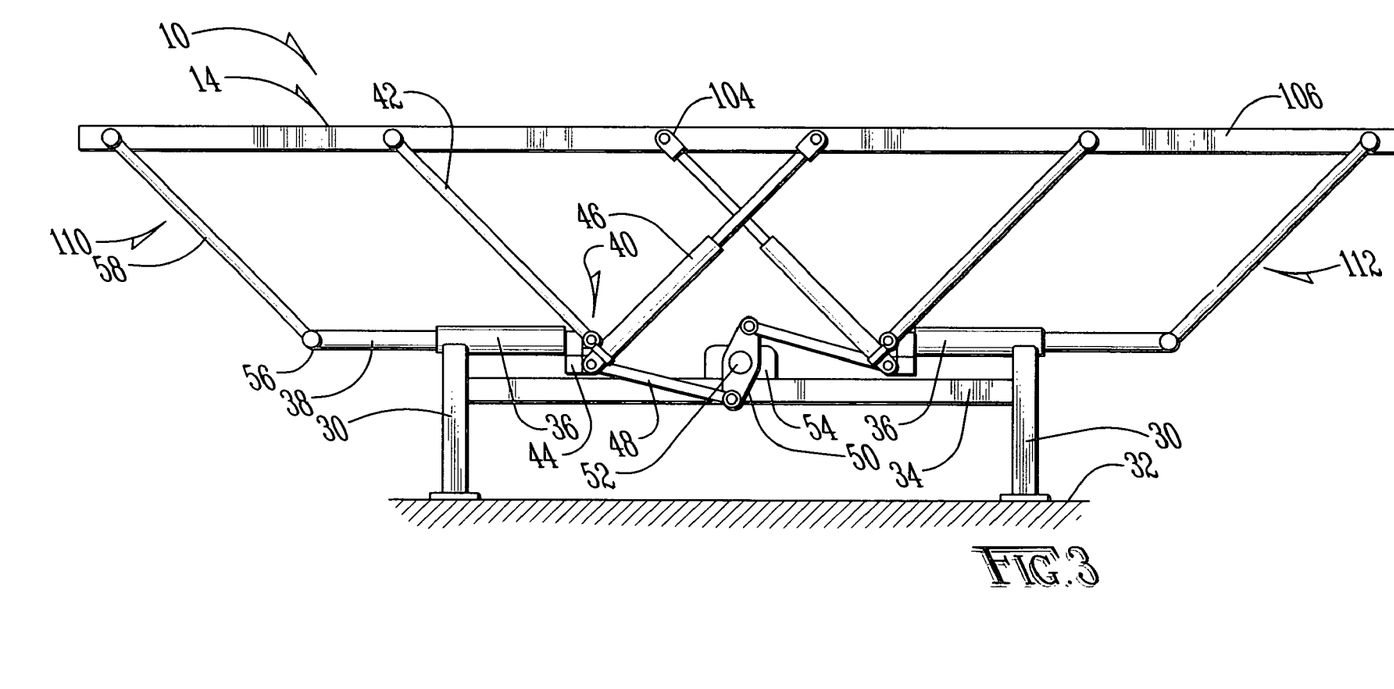
FIG. 3 illustrates a side elevation of the collapsible agricultural material storage container of the present invention, shown with the sidewalls removed.

Although the extension bin (14) may be constructed as part of a new combine (10), the description below will relate to retrofitting an existing combine (10) with an extension bin (14). (FIG. 1). If it is desired to construct the extension bin (14) as part of a new combine (10), a substantially similar construction process would be followed. As shown in FIG. 3, four mounting legs (30) are welded to the frame (32) of the combine (10). The mounting legs (30) are coupled into pairs by a crossbeam (34). Coupled to each mounting leg (30) is a guide sleeve (36), constructed of tubular steel. Provided through each guide sleeve (36) is a tube extension (38) which is sized to allow slidable movement within the guide sleeve (36). As the construction is substantially similar for each of the tube extensions (38), description will be limited to a single tube extension (38).

As shown in FIG. 3, pivotally coupled to the interior end (40) of the tube extension (38) is a parallel linkage arm (42). Welded to the tube extension (38) is a steel shoulder bracket (44) which prevents the tube extension (38) from moving too far through the guide sleeve (36). The shoulder bracket (44) also serves as a mount for a linear actuator, such as a hydraulic cylinder (46) pivotally coupled to the shoulder bracket (44). Also pivotally coupled to the shoulder bracket (44) is a link arm (48). The opposite end of the link arm (48) is pivotally coupled to a rocker (50) which, in turn, is welded or otherwise secured to a rock shaft (52). The rock shaft (52) is preferably journaled through a pair of shoulders (54) secured to the cross beams (34).

Figure 4:
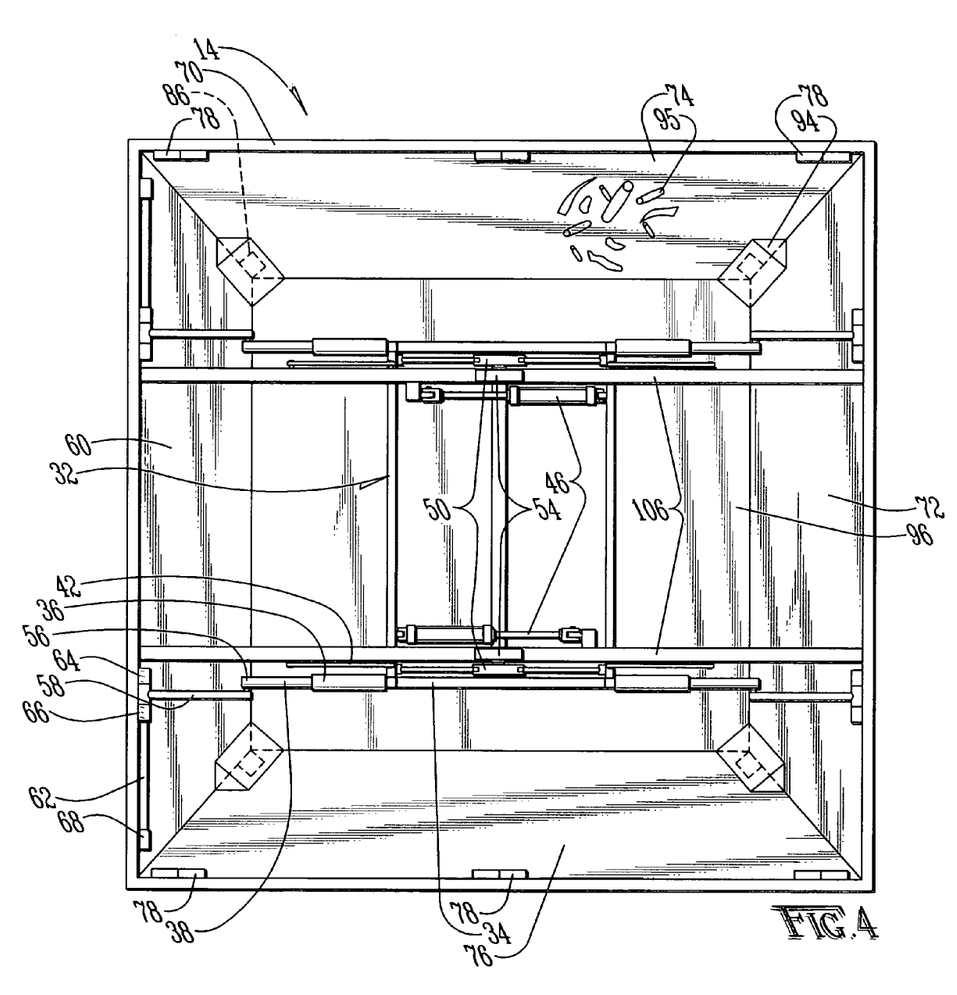
FIG. 4 illustrates a top elevation of the collapsible agricultural material storage container of the present invention.

As shown in FIG. 4, the outer end (56) of the tube extension (38) is pivotally coupled to a brace bar (58). The brace bar (58) is preferably welded to the front sidewall (60) of the extension bin (14) which, in the preferred embodiment, is constructed of sheet metal or the like. The brace bar (58) is welded to a hinge pin bar (62) constructed of tubular steel or the like, and welded or otherwise secured to the front sidewall (60). The hinge pin bar (62) is constructed with an outer dimension sufficient to fit into journaled engagement with an interior diameter of a plurality of knuckles (64), (66) and (68), welded or otherwise secured to the top frame (70) of the extension bin (14). The top frame (70) is preferably constructed of a plurality of steel bars of a square cross-section welded or otherwise secured to one another to form a rigid, square frame.

As the knuckles (64), (66) and (68) are welded to the top frame (70) and the hinge pin bar (62) is welded to the front sidewall (60), and positioned within the knuckles (64), (66) and (68), the front sidewall (60) is thereby hinged to the top frame (70). As shown in FIG. 4, the rear sidewall (72) is coupled to the top frame (70) in a similar manner. The right sidewall (74) and left sidewall (76) are secured to the top frame (70) by a plurality of piano hinges (78), or by any other hinge method known in the art.

Figure 5:
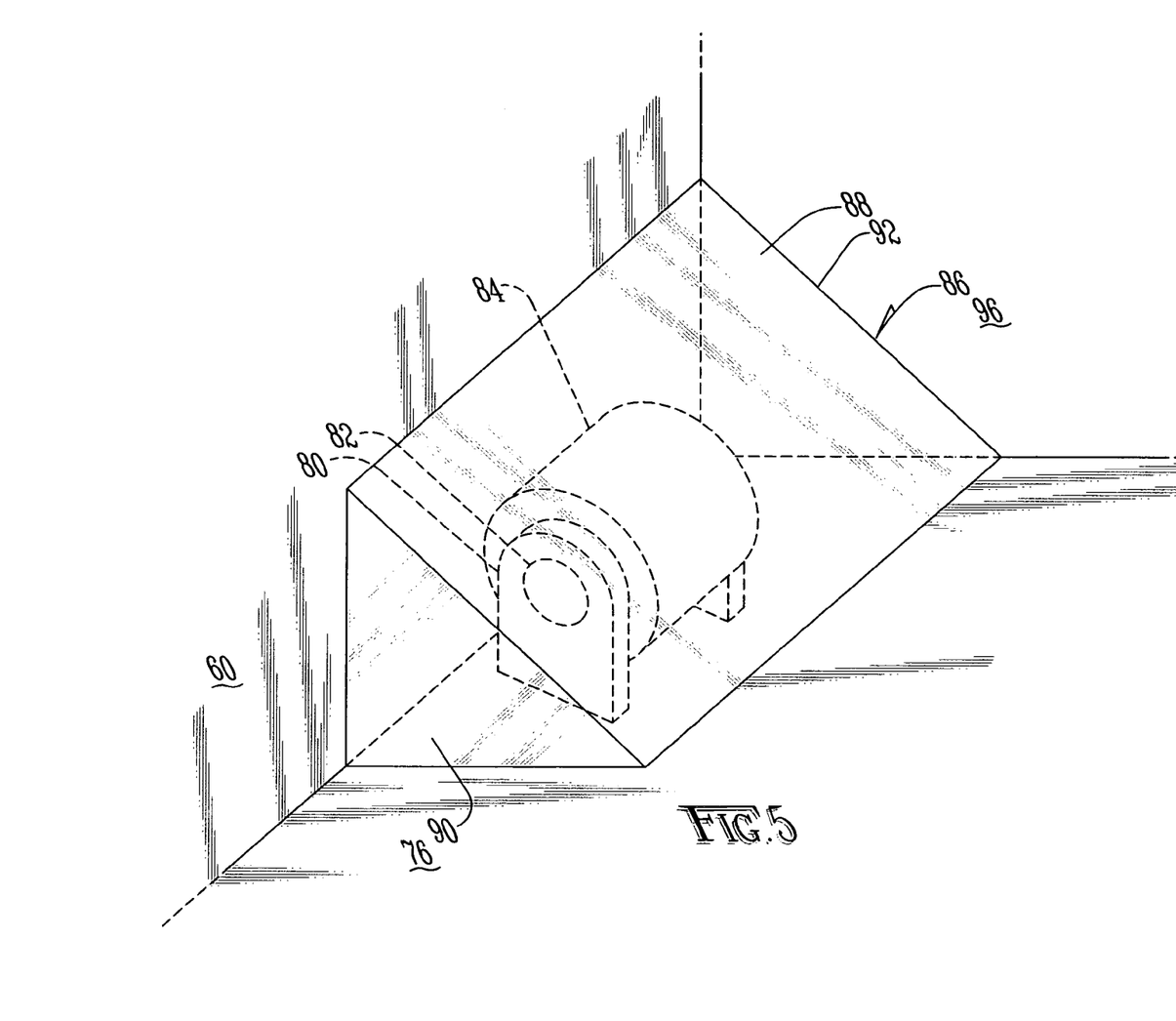
FIG. 5 illustrates a perspective view in partial phantom of the roller and ramp of the collapsible agricultural material storage container.

As shown in FIG. 5, coupled to the front sidewall (60) is a support bracket (80) coupled to an axle (82) which extends through a roller (84). While the support bracket (80) and axle (82) are preferably constructed out of steel, the roller (84) is preferably constructed of Delrin® or a similar wear resistant material. The roller (84) may be constructed of steel or other metal if desired. Provided on the left sidewall (76) is a ramp (86). The ramp (86) is constructed of a tab (88) cut from the left sidewall (76) and angled upward. Two triangular side plates (90) and (92) are welded between the tab (88) and the left sidewall (76). While the roller (84) and ramp (86) may be of any desired dimensions, in the preferred embodiment the roller (84) is provided with a diameter of approximately four centimeters. As shown in FIG. 4, two rollers (84) are coupled to the front sidewall (60) and to rollers (84) are coupled to the rear sidewall (72). Two ramps (86) are provided on the left sidewall (76) and two ramps (86) are provided on the right sidewall (74).

As shown in FIG. 4, a plurality of rubber boots (94) are secured to the right sidewall (74) and left sidewall (76) to cover the roller (84) when the extension bin (14) is in the extended position. The boots (94) may be constructed of any suitable size, dimension or of any suitable materials. Preferably, the rubber boots (94) are constructed so as to reduce the amount or grain or other agricultural material (95) provided within the extension bin (14) from coming into contact with the roller (84). If desired, the extension bin (14) can be opened into the grain storage bin (12) of the combine (10), or may be provided with a floor (96) coupled to the frame (32) of the combine (10). (FIGS. 1, 3 and 4). The sidewalls (60), (72), (74) and (76) are preferably angled sufficiently to prevent the agricultural material being collected from sticking on the sidewalls (60), (72), (74) and (76) when the extension bin (14) is being unloaded.

When it is desired to raise the extension bin (14), the hydraulic cylinders (46) are coupled to the hydraulic system (98) of the combine (10) actuated via a control panel (100) in the cab (102) of the combine (10). As the hydraulic cylinders (46) extend, the ends (104) of the hydraulic cylinders (46) pivotally coupled to a pair of tank frame braces (106) by shoulders (108) begin to push the tube extensions (38) through the guide sleeves (36). The tank frame braces (106) may be of any suitable construction but in the preferred embodiment are steel pipes having a square cross section.

As the tube extensions (38) move outward, they move the brace bars (58) outward as well. The parallel linkage arms (42), also coupled to the tube extensions (38), prevent the top frame (70) from rising unevenly. Additionally, the link arms (48) coupling the tube extensions (38) to the rock shaft (52) insure that both the front (110) and rear (112) of the top frame (70) raise in unison. The rocker (50) and rock shaft (52) insure that all of the tube extensions move in unison. Before the shoulder bracket (44) contacts the guide sleeve (36), the control panel (100) is used to deactuate the hydraulic cylinders (46). In the preferred embodiment, the control panel (100) contains an automatic shut-off to prevent damage to shut off the hydraulic cylinders (46) before the shoulder bracket (44) contacts the guide sleeve (36). Once the extension bin (14) has been fully extended, the extension bin (14) may be utilized to collect agricultural material (95) and the like as desired.

When it is desired to collapse the extension bin (14), the control panel (100) is utilized to retract the hydraulic cylinders (46). As the hydraulic cylinders (46) pull the tube extensions (38) inward, the rollers (84) contact the ramps (86) "popping" the right sidewall (74) and left sidewall (76) interior of the front sidewall (60) and rear sidewall (72). As the hydraulic cylinders (46) continue to retract, the rollers (84) roll along the undersides of the right sidewall (74) and left sidewall (76), pushing them inward as the hydraulic cylinders (46) draw the front sidewall (60) and rear sidewall (72) inward. Once the extension bin (14) has been fully collapsed as shown in FIG. 2, the control panel (100) is used to deactuate the hydraulic cylinders (46). Preferably, the control panel (100) is provided with an automatic shutoff which deactuates the hydraulic cylinders before the outer ends (56) of the tube extensions (38) contact the guide sleeve (36).

Figure 6:
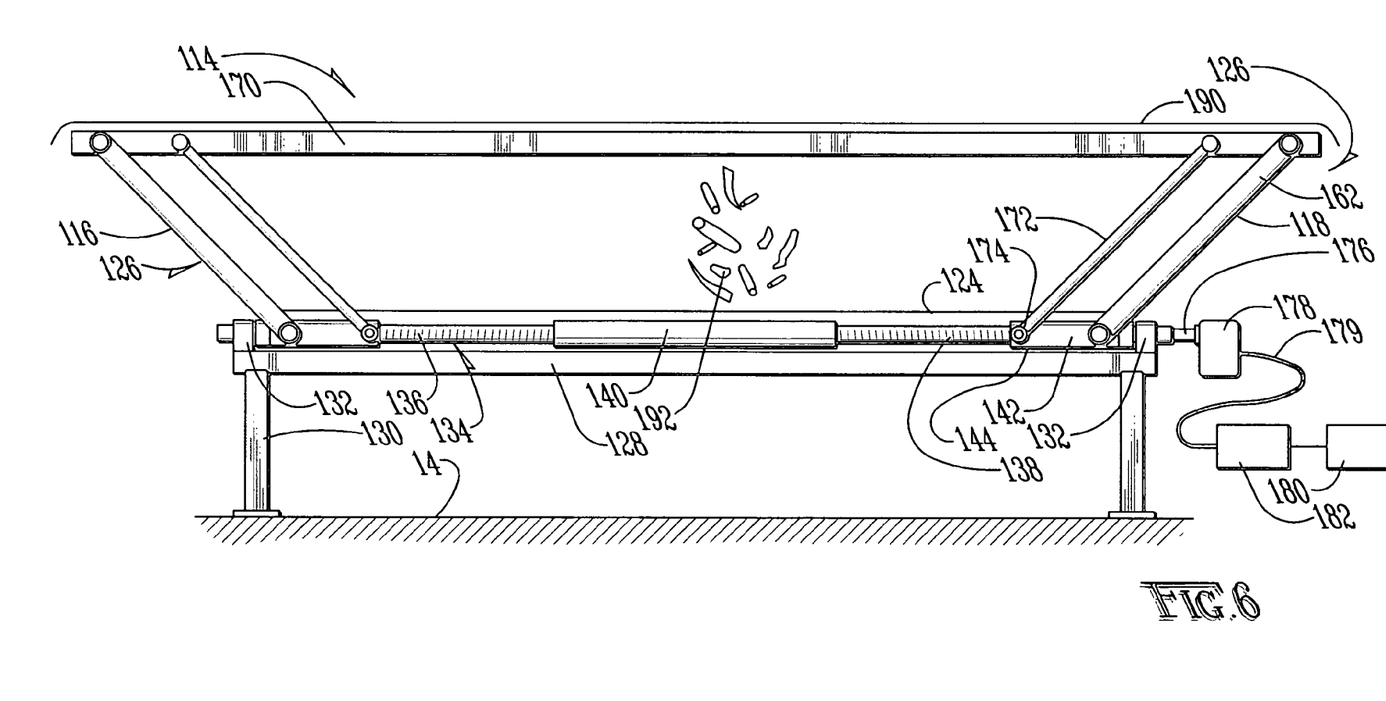
FIG. 6 illustrates a side elevation of an alternative embodiment of the present invention, shown with the collapsing and extension mechanism provided on the outside of the container.
Figure 7:
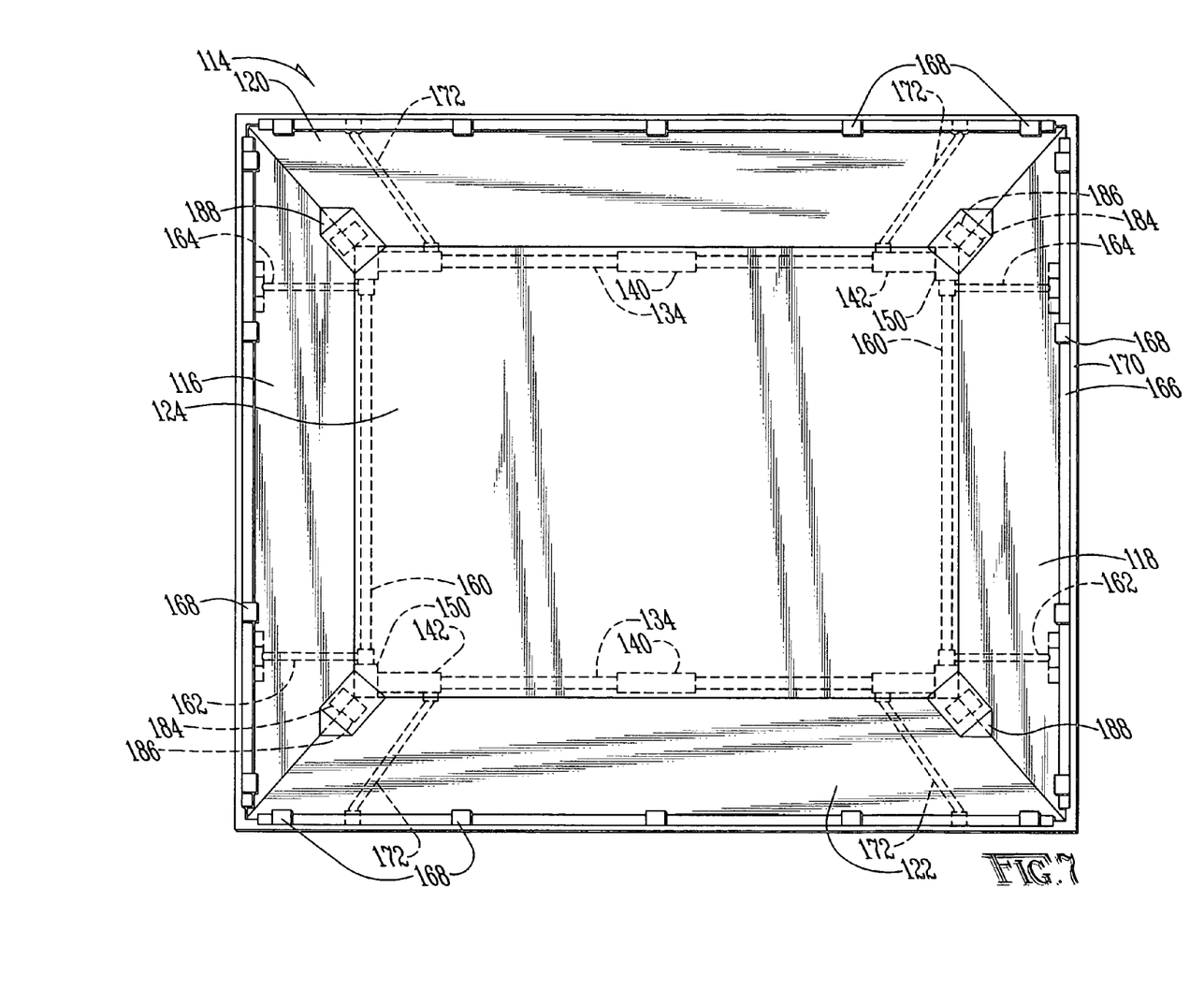
FIG. 7 is a top elevation of the alternative collapsible agricultural material storage container of FIG. 6.

An alternative embodiment of the extension bin is shown generally as (114) in FIG. 6. As shown in FIG. 7, the extension bin (114) includes four sidewalls (116), (118), (120) and (122) provided over a floor (124). The extension bin (114) is provided with a pair of extension systems (126). The extension systems (126) are provided exterior of the extension bin (114) to allow the extension bin (114) to be used in situations requiring an unobstructed interior. As the extension systems (126) are similar in construction, description will be limited to a single extension system. As shown in FIG. 6, the extension system (126) includes a mounting bracket (128) which, in the preferred embodiment is a steel bar which may either be welded to the frame (130) of the combine or, if desired, mounted to a grain storage bin or extension bin (14), such as those described above.

Coupled to the mounting bracket (128) is a pair of tank mount braces (132) which serve as bushings to support a drive shaft (134). The drive shaft (134) is preferably provided with right hand machine threads (136) on one side, and left hand machine threads (138) on the opposite side. If desired, the right hand threaded portion may be welded to the left hand threaded portion by a couple bar (140) which may be a standard steel pipe.

Figure 8:
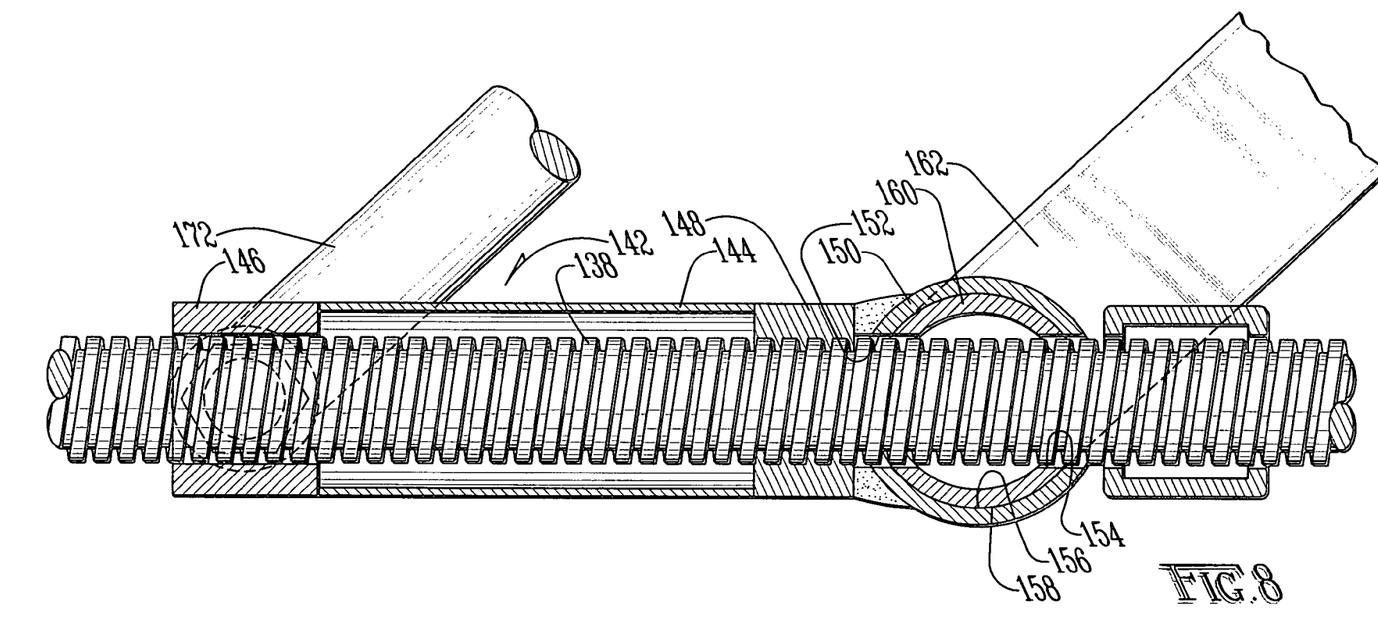
FIG. 8 illustrates a side elevation in cross section of the alternative collapsible agricultural material storage container of FIG. 6, showing the control arm brace of the present invention.

As shown in FIG. 8, an arm brace (142) is provided over the left hand threads (138). The arm brace (142) includes a cylindrical body (144) having an interior diameter greater than the outermost diameter of the left hand threads. Welded to either side of the body (144) are a bushing (146) and a machine nut (148) having left hand threads. Welded to the outermost machine nut (148) is a short outer pipe (150) approximately ten centimeters in length. The outer pipe (150) is provided with a first opening (152) and second opening (154) of dimensions slightly greater than the left hand threads (138) to allow the left hand threads (138) to pass through the outer pipe (150). As shown, the outer pipe (150) is provided with an interior diameter (156) slightly greater than an exterior diameter (158) of an inner pipe (160) so as to journal the inner pipe (160) therein. As shown in FIG. 7, the inner pipe (160) is coupled on either end with the outer pipes (150). The outer pipes (150) act as journals to allow the inner pipe (160) to rotate in relationship therewith. Welded or otherwise secured to the inner pipe (160) is a pair of parallel linkage arms (162) and (164) which, in turn, are welded to the rear sidewall (118). As shown in FIG. 7, the rear sidewall (118) is welded to a hinge pin bar (166). Provided around the hinge pin bar (166) are a plurality of steel knuckles (168), each having an interior diameter slightly greater than the exterior diameter of the hinge pin bar (166). The knuckles (168) are welded or otherwise secured to a top frame (170), constructed of steel in a manner such as that described above. The front sidewall (116), right sidewall (120) and left sidewall (122) are all provided with hinge pin bars (166) coupled to the top frame (170) by knuckles (168) in a similar manner.

As shown in FIG. 6, another parallel linkage arm (172) is journaled to one end (174) of the arm brace (142) and on the other end to the top frame (170). This arrangement creates a parallel linkage system which allows the top frame (170) to move downward without tilting or torquing.

Coupled to the drive shaft (134), as shown in FIG. 6, is a transfer shaft (176) coupled to a hydraulic motor (178). The hydraulic motor (178) is coupled via hydraulic lines (179) to the hydraulic system (180) of the combine (10) which, in turn, is coupled to a control panel (182) similar to that described above.

As shown in FIG. 7, the rear sidewall (118) and front sidewall (116) are provided with rollers (184), while the right sidewall (120) and left sidewall (122) are provided with ramps (186). The rollers (184) and ramps (186) are covered by rubber boots (188), in a manner similar to that described above, to prevent agricultural material from coming into contact with the rollers (184).

Figure 9:
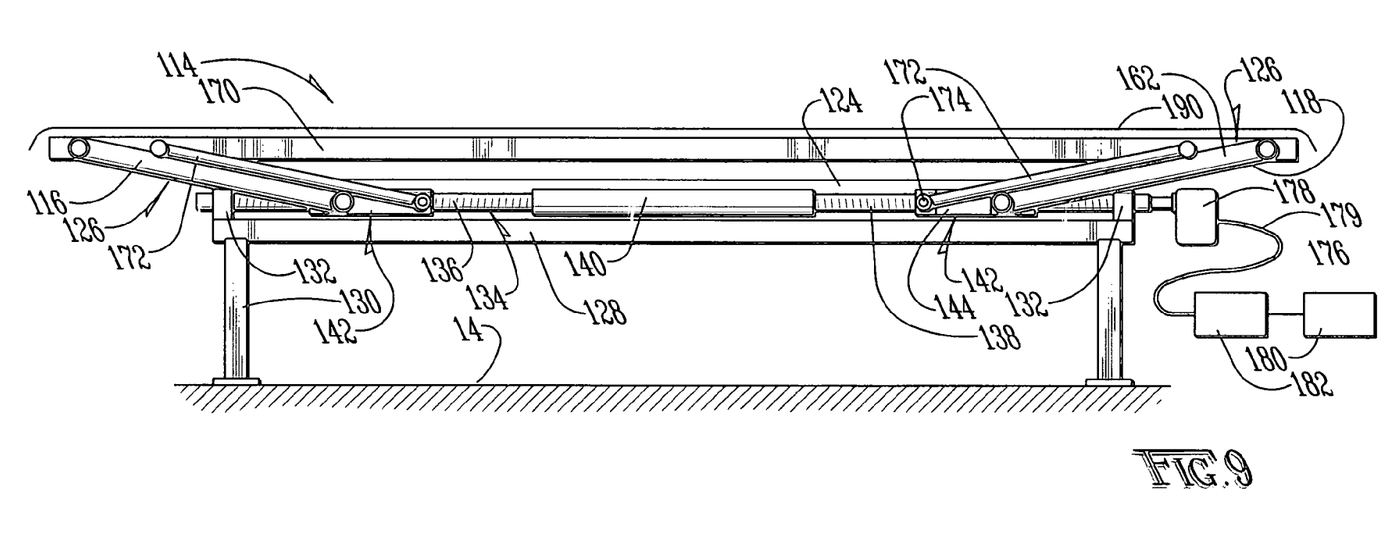
FIG. 9 illustrates a side elevation of the alternative collapsible agricultural material storage container of FIG. 6, shown in the collapsed orientation.

When it is desired to collapse the extension bin (114), the control panel (182) is used to actuate the hydraulic system (180) to turn the hydraulic motors (178). As the hydraulic motors (178) turn the drive shafts (134) via the transfer shafts (176), the arm braces (142) move toward the couple bar (140). The parallel linkages created by the parallel linkage arms (162) and (172) maintain the top frame (170) parallel to the mounting bracket (128) as the extension bin (114) collapses. The hydraulic motors (178) continue to lower the top frame (170) until the desired collapse height is attained. (FIG. 9). Preferably, the collapsed height is no more than thirty centimeters, more preferably, no greater than twenty centimeters and, even more preferably, no greater than ten centimeters and, most preferably, about eight and one-half centimeters. This translates into a reduction in the overall height of the extension bin (114) by preferably fifty percent, more preferably seventy-five percent, even more preferably eighty percent, and most preferably more than ninety percent.

When it is desired to expand the expansion bin (114), the control panel (182) is used to actuate the hydraulic system (180) of the combine (10) to turn the hydraulic motors (178) in the opposite direction. This moves the arm braces (142) away from the couple bar (140) and causes the parallel linkage arms (162) and (172) to raise the top frame (170) away from the mounting bracket (128). The hydraulic motors (178) continue to raise the top frame (170) until a desired height is attained. If desired, the control panel (182) may be provided with automatic stops to prevent damage to the hydraulic motors (178) as the extension bin (114) is extended and collapsed. While the sidewalls (116), (118), (120) and (122) may be of any suitable size or dimension, they are preferably provided with an angle so as to prevent the agricultural material from sticking on the sides of the extension bin (114) when the extension bin (114) is being emptied. If desired, the top frame (170) may be provided with a cover (190) which may be either rigid or flexible, and which may be used to keep moisture and impurities from the agricultural material (192) provided within the extension bin (114). (FIGS. 6-7).

Figure 10:
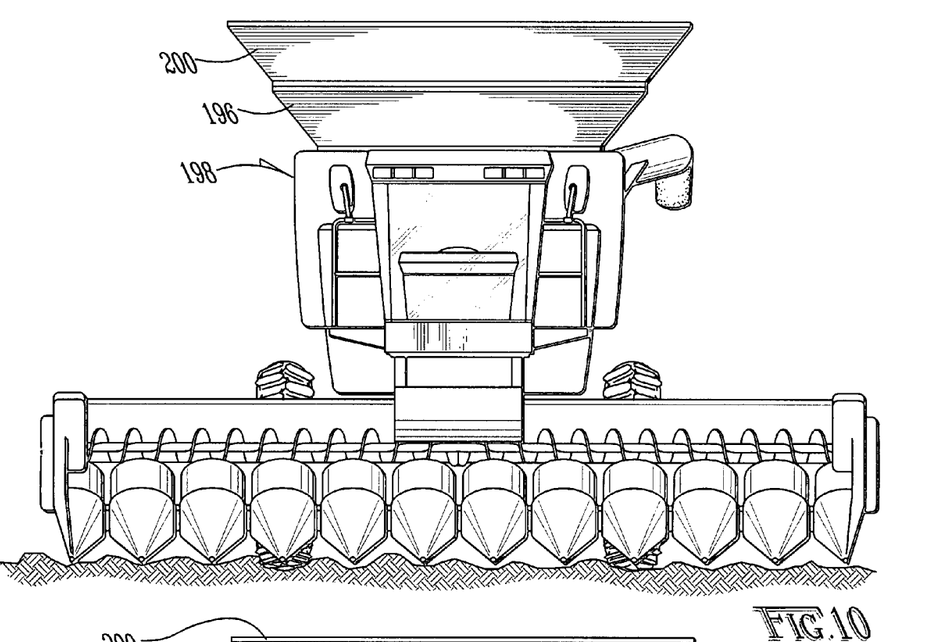
FIG. 10 illustrates an alternative embodiment of the present invention, shown with the collapsible agricultural material storage container of the present invention provided on a combine and the alternative collapsible agricultural material storage container provided on top of the collapsible agricultural material storage container.

FIG. 10 shows an extension bin (196) according to the preferred embodiment positioned on a combine (198) and an extension bin (200) according to the alternative embodiment of the present invention is provided on top of the extension bin (196) of the preferred embodiment. Utilizing the extension bin (196) of the preferred embodiment below, provides for the increased lifting power associated with the preferred embodiment to allow the placement of the alternative embodiment extension bin (200) above. The placement of the alternative embodiment extension bin (200) above allows for evacuating the extension bin (200) without the internal mechanism of the preferred embodiment extension bin (196) obstructing the evacuation.

Figure 11:
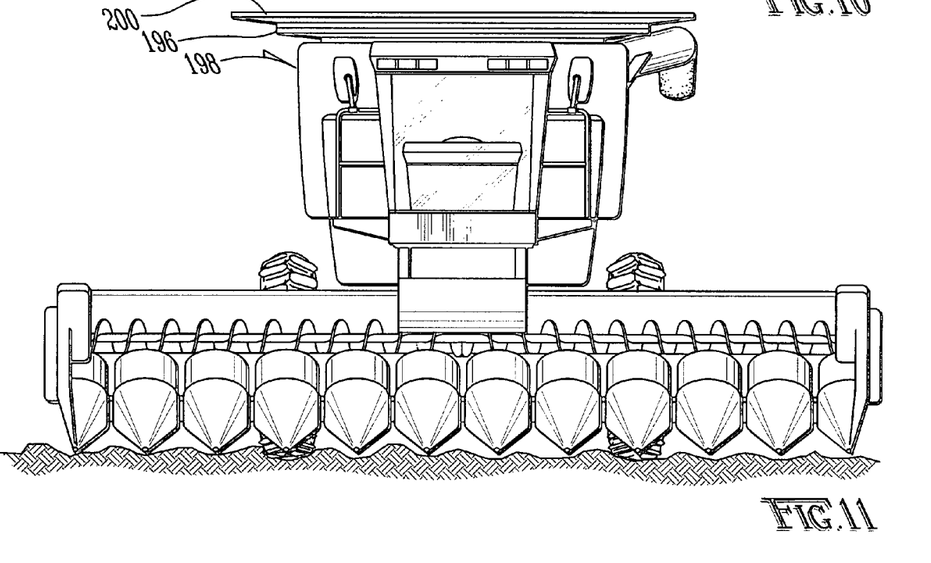
FIG. 11 illustrates the combine of FIG. 10, shown with both bins collapsed.

When it is desired to transport the combine (198), both of the extension bins (196) and (200) may be lowered, as shown in FIG. 11, to allow the combine (198) to carry a much increased quantity of agricultural material in the field, but allow a substantially reduced overall height of the combine (198) during transport and storage.

Figure 12:
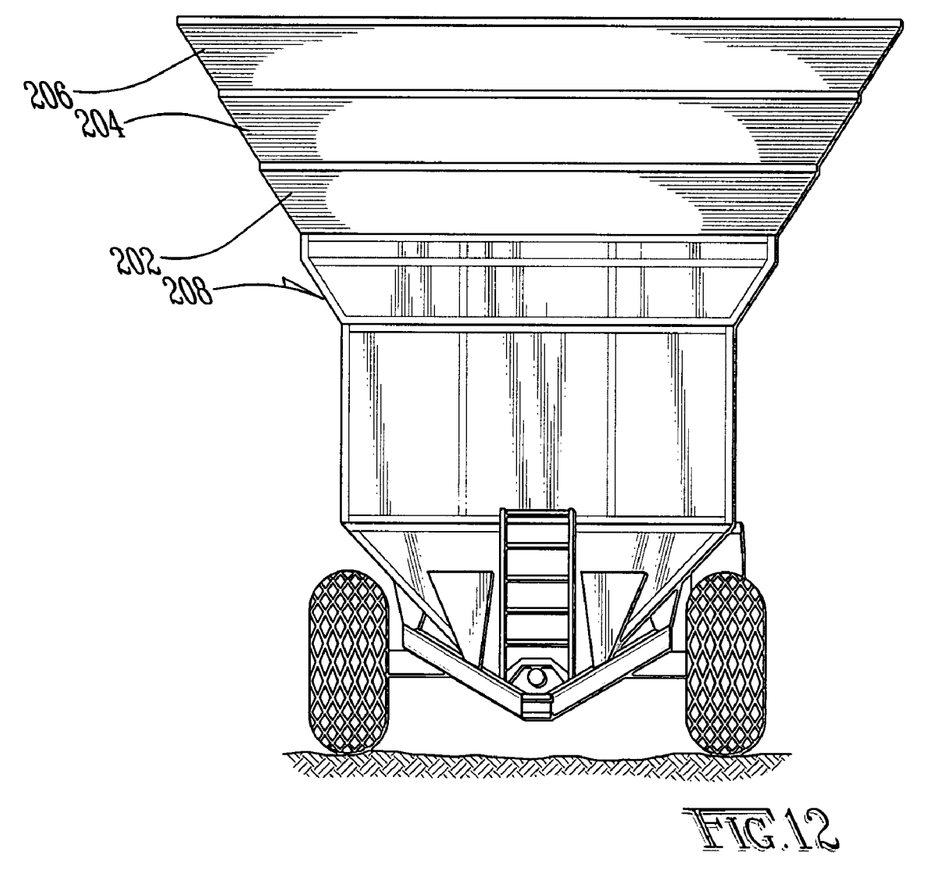
FIG. 12 illustrates an alternative embodiment of the present invention with three collapsible storage bins provided on a grain wagon.

Although the invention has been described with respect to a preferred embodiment thereof, it is to be understood that it is not to be so limited since changes and modifications can be made therein which are within the full, intended scope of this invention as defined by the appended claims. For example, any desired number or configuration of extension bins may be provided on a combine. Alternatively, one or more extension bins (202) and (206) according to the present invention may be provided on a grain wagon (208) in a manner such as that described above in the preferred embodiment to increase the capacity of the grain wagon (208) during use and to decrease the vertical dimension of the grain wagon (208) during transport. (FIG. 12). Additionally, any desired number of bins (202), (204) and (206) may be provided on any type of vehicle to increase the storage during use and decrease the storage during transport.

What is claimed is:

1. A material transport vehicle comprising:
   (a) a frame;
   (b) a wheel coupled to said frame;
   (c) a container coupled to said frame, said container comprising a first sidewall having a top and a bottom and coupled to said frame and a second sidewall having a top and a bottom and coupled to said frame;
   (d) first means for moving said bottom of said first sidewall toward said bottom of said first sidewall and toward a horizontal position sufficiently to decrease the height of said first sidewall by at least sixty percent;
   (e) second means for pivoting said second sidewall toward a horizontal position sufficient to decrease the height of said second sidewall by at least sixty percent; and
   (f) wherein said container is provided with a top rim and a bottom, wherein said top rim defines a greater surface area than said bottom.

2. The material transport vehicle of claim 1, further comprising
   (a) a third sidewall having a top and a bottom and coupled to said frame; and
   (b) third means for moving said bottom of said third sidewall toward a horizontal position sufficient to decrease the height of said third sidewall by at least sixty percent.

3. The material transport vehicle of claim 2, further comprising a parallel linkage secured to said first sidewall.

4. The material transport vehicle of claim 3, further comprising a supplemental parallel linkage secured to said first sidewall.

5. The material transport vehicle of claim 2 further comprising:
   (a) a fourth sidewall having a top and a bottom and coupled to said frame; and
   (b) fourth means for moving said bottom of said fourth sidewall toward a horizontal position sufficient to decrease the height of said fourth sidewall by at least sixty percent.

6. The material transport vehicle of claim 1, wherein said container has a capacity of at least one cubic meter.

7. The material transport vehicle of claim 1, further comprising a supplemental container positioned on said container.

8. The material transport vehicle of claim 7, wherein said supplemental container has a capacity of at least one cubic meter.

9. The material transport vehicle of claim 1, wherein said at least a portion of said first sidewall overlaps at least a portion of said second sidewall.

10. The material transport vehicle of claim 1, further comprising a supplemental wheel coupled to said first sidewall.

11. The material transport vehicle of claim 10, further comprising a parallel linkage secured to said first sidewall.

12. The material transport vehicle of claim 1, further comprising:
   (a) means coupled to said frame for harvesting agricultural material; and
   (b) means coupled to said harvesting means for transporting agricultural material from said harvesting means to said container.

13. A material transport vehicle comprising:
   (a) a frame;
   (b) a wheel coupled to said frame;
   (c) a container coupled to said frame, said container comprising:
      (i) a top rim;
      (ii) a bottom;
      (iii) wherein said top rim defines a greater surface area than said bottom;
      (iv) a first sidewall having a top and a bottom;
      (v) a second sidewall having a top and a bottom;
      (vi) wherein said first sidewall is pivotably coupled in a manner which allows said bottom of said first sidewall to pivot toward said bottom of said second sidewall and toward a horizontal position sufficiently to decrease the height of said first sidewall by at least sixty percent; and
      (vii) wherein said second is pivotably coupled in a manner which allows said bottom of said second sidewall to pivot toward said bottom of said first sidewall and toward a horizontal position sufficiently to decrease the height of said second sidewall by at least sixty percent.

14. The material transport vehicle of claim 13, further comprising:
   (a) wherein said first sidewall is pivotably coupled in a manner which allows said bottom of said first sidewall to pivot toward said bottom of said second sidewall and toward a horizontal position sufficiently to decrease the height of said first sidewall by at least seventy percent; and
   (b) wherein said second is pivotably coupled in a manner which allows said bottom of said second sidewall to pivot toward said bottom of said first sidewall and toward a horizontal position sufficiently to decrease the height of said second sidewall by at least seventy percent.

15. The material transport vehicle of claim 13,
   (a) wherein said first sidewall is pivotably coupled in a manner which allows said bottom of said first sidewall to pivot toward said bottom of said second sidewall and toward a horizontal position sufficiently to decrease the height of said first sidewall by at least eighty percent; and
   (b) wherein said second is pivotably coupled in a manner which allows said bottom of said second sidewall to pivot toward said bottom of said first sidewall and toward a horizontal position sufficiently to decrease the height of said second sidewall by at least eighty percent.

16. The material transport vehicle of claim 15, further comprising a supplemental container positioned on said container.

17. The material transport vehicle of claim 13, further comprising a supplemental container positioned on said container.

18. The material transport vehicle of claim 13, wherein said supplemental container has a capacity of at least one cubic meter.

\* \* \* \* \*